United States Patent [19]

Wagner

[11] 3,860,922

[45] Jan. 14, 1975

[54] ANSWER DEVICE FOR AN INTERROGATION-ANSWER SYSTEM HAVING TIME DEPENDENT DIFFERING CODES AND PROVISION OF SPECIAL SIGNAL MEANS

[76] Inventor: Gerhard Wagner, Weiherfeldstrasse 5, 8154 Schaftlach, Germany

[22] Filed: Feb. 9, 1973

[21] Appl. No.: 331,174

Related U.S. Application Data

[63] Continuation-in-part of Ser. No. 110,889, Jan. 29, 1971, abandoned.

[52] U.S. Cl. .......................... 343/6.8 LC, 343/6.5 R
[51] Int. Cl. .............................................. G01s 9/56
[58] Field of Search ......... 343/6.5 R, 6.5 LC, 6.8 R, 343/6.8 LC

[56] References Cited
UNITED STATES PATENTS

| | | | |
|---|---|---|---|
| 3,047,857 | 7/1962 | Rockett et al. .................. | 343/6.5 R |
| 3,054,099 | 9/1962 | Gaerttner et al. ................ | 343/6.5 R |
| 3,156,895 | 11/1964 | Fiske et al. ..................... | 343/6.5 LC |
| 3,302,196 | 1/1967 | McCoy ............................ | 343/6.5 R |

Primary Examiner—T. H. Tubbesing
Attorney, Agent, or Firm—Hill, Gross, Simpson, Van Santen, Steadman, Chiara & Simpson

[57] ABSTRACT

A secondary radar interrogation-answer system provides a special answer signal to indicate a special condition or situation at the answering device (transponder). The transponder operates with time dependent different interrogation codes which are successively transmitted by an interrogation device and by one or more answering devices to which the time dependent program of the interrogation devices is known. The answering device makes use of similar time dependent answering codes which are arranged in a predetermined relationship with respect to the interrogation codes. The answering device is provided with an arrangement for triggering and transmitting the special situation signal in case of an emergency or a special circumstance, the special situation signal comprising a code which, with respect to the code program, is a code which is to be transmitted only in the future under normal operating conditions.

10 Claims, 3 Drawing Figures

ANSWER DEVICE FOR AN INTERROGATION-ANSWER SYSTEM HAVING TIME DEPENDENT DIFFERING CODES AND PROVISION OF SPECIAL SIGNAL MEANS

CROSS REFERENCE TO RELATED APPLICATIONS

This application is a continuation-in-part application of Ser. No. 110,889, filed Jan. 29, 1971, now abandoned, and is also related to application Ser. No. 110,888, filed Jan. 29, 1971, now abandoned in favor of a continuation-in-part application Ser. No. 331,173, filed Feb. 9, 1973, which application is assigned to the same assignee as the present invention.

BACKGROUND OF THE INVENTION

1. Field of the Invention

This invention relates to an answering device, also called a transponder, for an interrogation-answer system having time dependent differing interrogation codes which are transmitted successively in time by an interrogation device and by one or more answer devices to which the time dependent program of the interrogation device is known, and also, in a similar manner, making use of time dependent answering codes associated with the interrogation codes in accordance with a predetermined relationship in which a clock in the answering device controls the code sequence or repetition and is synchronized with a clock in the interrogation device.

2. Description of the Prior Art

The above-identified related patent application describes the basic type of interrogation-answer system which with the present invention is concerned.

Special situation signals in coded form which indicate to the interrogation device the occurrence of a special situation can be transmitted from an answering device upon the occurrence of special circumstances. However, a danger exists that the coded special signal will be improperly imitated by an enemy airplane, and thereby a pickup or combating is prevented.

SUMMARY OF THE INVENTION

The problem of meeting or counteracting the possibilities of improper imitation is a problem underlying the present invention, and the primary object of the invention is to provide techniques for solving this problem.

According to the invention, the foregoing objective is achieved in an interrogation-answer system of the aforementioned type by providing in the answering device an arrangement for triggering and transmitting a special signal to indicate emergencies or other special circumstances and means for coding this special signal with codes which, with respect to the code program, are to be transmitted only in the future under normal operating conditions.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
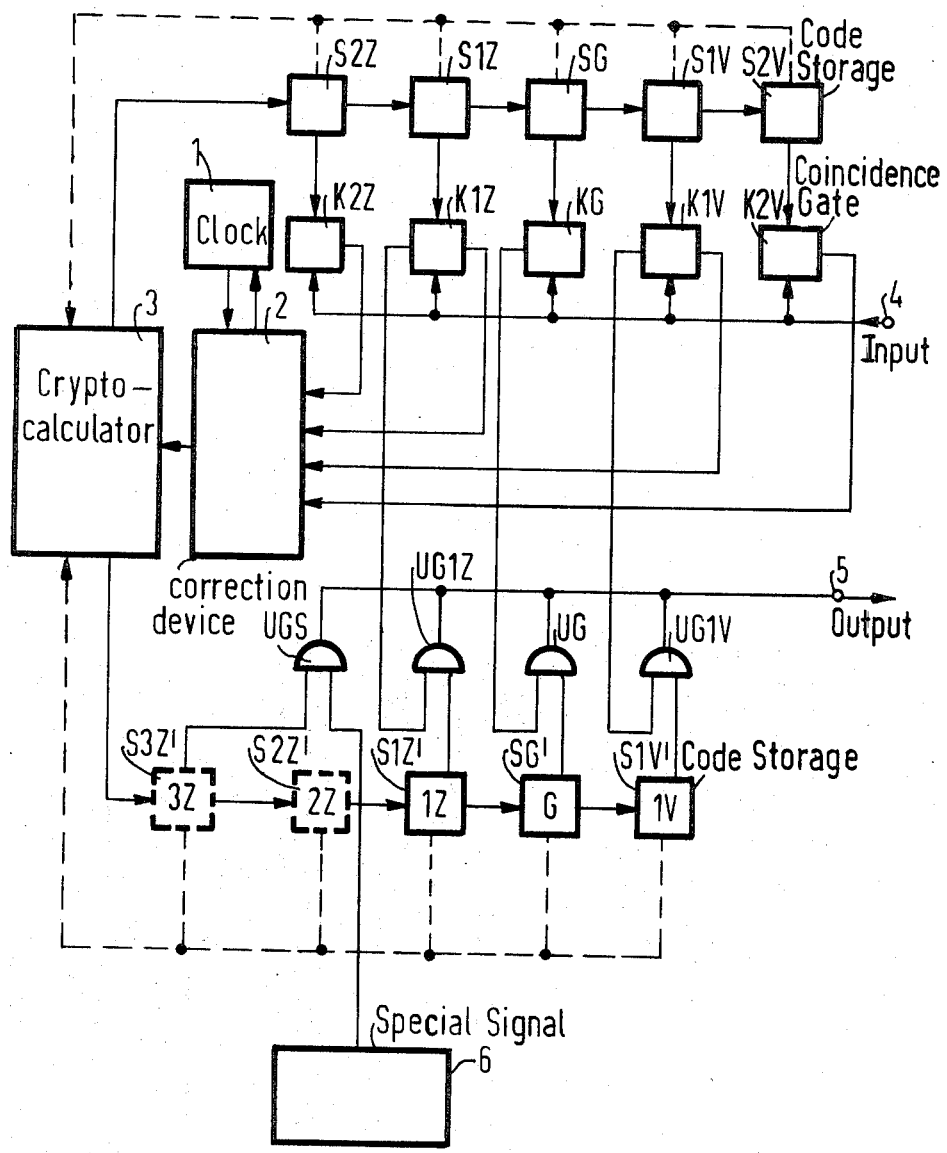
FIG. 1 is a block diagram illustration of an answering device.

The program and coding apparatus may be constructed in accordance with the teachings of David Wise and Thomas B. Ross as set forth in their book "The Espionage Establishment," particularly Chapter 2, Random House, copyright 1967 by the authors, and the teachings set forth in the "Handbook of Information Processing" by Steinbuch, Springer-Verlag, Berlin/Heidelberg/New York, 1967, pages 969–971, and in the 1957 issue of the periodical "NTZ," pages 277 et seq. The storage sections may be constructed in accordance with well known shift register techniques. Reference may also be taken to an article by Karnaugh, entitled "The Map Method for Synthesis of Combinational Logic Circuits," appearing in the November 1953 issue of the *AIEE Transactions*, Part I. pages 593–598. In the last mentioned article the example of a relay translator on page 597 is of particular interest in that a simple example of a translator is disclosed. Also of interest to one who wishes to practice the present invention is the article "On the Transmission of Information by Orthogonal Time Functions," by H. F. Harmuth, as printed in the July 1960 issue of *AIEE Transactions*, Pages 248–255.

Inasmuch as the above-mentioned Steinbuch publication and the "NTZ" publication are not in English, excerpts of these publications are discussed below.

As to the Steinbuch publication, the first half of Page 970 states that coupling control can be described as follows $x_1 = x_2 \Rightarrow y (\bar{x}_1 + \bar{x}_2) \vee (x_1 + x_2)$ The article goes on to say that the output variable is a mere function of the input variable. If several circuits are combined into a network in such a way that several output variables $y_1, y_2, y_3,...$etc are provided, one can speak of a translator. The author continues by saying that in the English language the term combinational switching circuit is in somewhat general use. Each combination of input information $x_1, x_2, x_3,...$etc. which is available at a certain time leads to one combination of output variables $y_1, y_2, y_3...$etc. A circuit is, in this sense, a trivial or small scale translator. The translator does not employ storage elements. When the $y_i$ output depends at a certain time on a $x_k$ input, it is obviously unimportant which combination of input information $x_k$ has previously arrived before this time, or at any other time. By means of a system of coupling equations of Boolean Algerba, the attitude of a translator can be described. The extension of the actual coupling process over long periods of time has therefore been eliminated from consideration. In a particularly simple example, the description of the translator may be set forth in the form of a table as follows:

| $x_1$ | $x_2$ | $x_3$ | $y_1$ | $y_2$ | $y_3$ |
|---|---|---|---|---|---|
| 0 | 0 | 0 | 1 | 0 | 0 |
| 0 | 0 | 1 | 1 | 0 | 1 |
| 0 | 1 | 0 | 1 | 0 | 0 |
| 0 | 1 | 1 | 0 | 1 | 1 |
| 1 | 0 | 0 | 1 | 0 | 1 |
| 1 | 0 | 1 | 0 | 1 | 0 |
| 1 | 1 | 0 | 0 | 0 | 1 |
| 1 | 1 | 1 | 0 | 0 | 0 |

The "NTZ" article discusses translators on page 279, as follows. All electrical translators in the previously mentioned cases have a common feature in that words of an input language are to be translated into words of an output language. For example:

| INPUT LANGUAGE | OUTPUT LANGUAGE |
|---|---|
| Number Code A | Number Code B |
| Multiplicand and Multiplier | Product |
| Sum A, Sum B | Sum 1+B |
| Telephone Character | Conductor Path |
| Telephone Character | Zone |
| Gross Salary, Tax Bracket | Amount of Tax |
| No. Article | Price of Article |
| Name of Post Office (Telephone Office) | Area Code |
| Words of Language A | Words of Language B |

Figure 2:
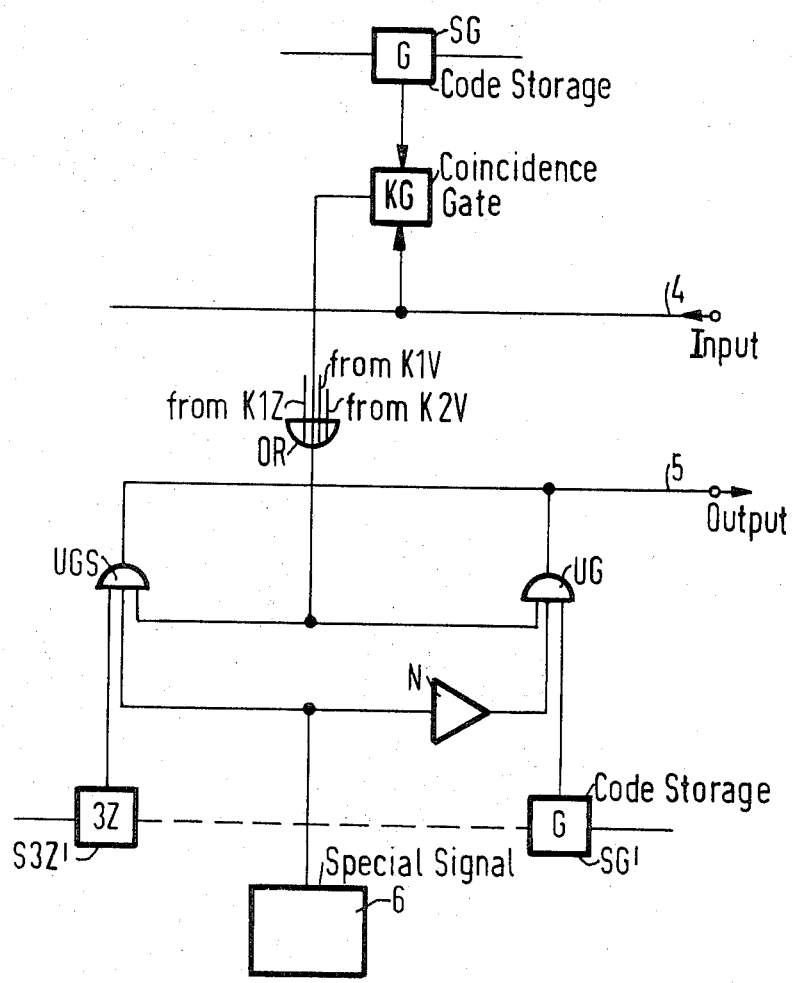
FIG. 2 illustrates a part of the block diagram of FIG. 1, with more specific circuit details being shown.

In general, each word of the input language must be illustrated in the translator in some form, individually and explicitly, unless it is a coincidence circuit in a static translator, or it is arranged as a stored cell in a memory. For example, during multiplication, the result can not be obtained merely from the multiplier or the multiplicand which means that all possible combinations from both quantities must be formed in a decimal multiplier number from a corresponding number of coincidence circuits (as shown in FIG. 2 of this article). Only if the multiplier or the multiplicand is zero, will one quantity statement be sufficient, which means that the coincidence circuits for 0x0, 0x1, 0x2...0x9 can be omitted, and from a zero in the input, the result zero can be directly obtained. As in these simple examples, in the case of most applications under normal circumstances, all complete input words must be set forth separately so that a translator with 10,000 input words, for example, wherein no corelation exists between input words and output words, requires a total of 10,000 individual coincidence circuits (as illustrated in Section 3.6 of this article) and this effort and expense cannot be reduced by any technical measure.

Referring to FIG. 1, an answering device is illustrated as comprising a clock 1 for establishing a time standard, which, by way of a correction device 2, controls a cryptocalculator 3. In regarding the aforesaid book of Steinbuch it can be seen that the $x_1$, $x_2$, $x_3$ represent, in digital counting, the successive numbers 1, 2, 3 and so on (line one $\hat{=}$ 0, line two $\hat{=}$ 1, line three $\hat{=}$ 2 and so on). Yet the corresponding $y_1$, $y_2$, $y_3$ do not represent successive numbers. They are mixed in a random distribution. Therefore, it is not possible to find out from the $y_1$, $y_2$, $y_3$ that they are generated by a successive counting at the $x_1$, $x_2$, $x_3$. It is possible to produce the $x_1$, $x_2$, $x_3$ in a successive manner by using a clock. If a translator is connected to the clock in the way described above, one can use the combination clock and translator for producing codes $y_1$, $y_2$, $y_3$ which successively change in time in a random manner seen from the output. The clock 1 can be used as a digital counter in the way described in the Steinbuch publication ($x_1$, $x_2$, $x_3$). The cryptocalculation is performed by the translator described in the Steinbuch publication, which translates the successive $x_1$, $x_2$, $x_3$ codes to random $y_1$, $y_2$, $y_3$ codes at its output. At the interrogation station the same clock 1 and translator as a cryptocalculator 3 are used. Therefore, if both stations start at the same time counting by their clocks 000, 001, 010... (= $x_1$, $x_2$, $x_3$) they will both successively produce at the same time the same codes 100, 101, 100... (= $y_1$, $y_2$, $y_3$).

Therefore, in the cryptocalculator 3 certain codes are generated in accordance with a program which is known to the appertaining interrogation device or devices, the codes being successively generated in a sequence; one code to another is not reproducible for outsiders, but remains reproducible in the interrogation device and in the answering device. The individual interrogation codes are fed to memories S2Z, S1Z, SG, S1V and S2V. Here and hereinafter in the text, the index "2Z" means the second future time, the index "1Z" means the first future time, the index "G" indicates the present time, the index "1V" indicates the first past time and the index "2V" indicates the second past time with respect to the time sequence of the interrogation codes.

When an interrogation code is received by way of the input terminal 4 with a certain code, then, if the clocks of the interrogation device and the answer device are in synchronism, the coincidence stage KG will respond and an answering signal will be delivered over the AND gate UG with the code G by way of the line 5. For this response, the second input of the AND gate UG is connected to a second memory SG'. The information in the second memory SG, as well as in the further code memories S1V', SG', S1Z', S2Z' and S3Z' are likewise delivered from the cryptocalculator 3 and are related to the information in the upper memories S2Z, S1Z, SG, S1V and S2V provided with the same index established by the cryptocalculator 3.

When an interrogation signal is received and has an interrogation code belonging to or corresponding to the first past code of the answering device, the coincidence gate K1V responds and allows a control signal to pass to the correction device 2. The fact that there is agreement between the arriving interrogation code and the information stored in the memory S1V shows, in particular, that the time standard established by the clock 1 is leading with respect to the time standard in the appertaining interrogation apparatus. The signal from the coincidence gate K1V causes a resetting pulse in the correction device 2 for the cryptocalculator 3 so as to eliminate this time displacement. The coincidence gate K1V also supplies a signal to one input of an AND gate UG1V whose other input is supplied with the first past answer code "IV" stored in the memory S1V'. The code "1V" is therefore transmitted back to the interrogation device to indicate that the clock 1 is leading by one time position.

If the clock 1 leads by a greater amount, the arriving interrogation code will agree with the code stored in the memory S2V and cause the coincidence gate K2V to respond. The gate K2V now triggers a correction signal to the correction device 2.

An analogous procedure is followed if the time clock 1 is lagging with respect to the clock in the interrogation device. This situation has the consequence that the arriving interrogation signals have a code which correspond to the first future code (memory S1Z) or the second future code (memory S2Z) of the answering device. In the case where the time clock 1 lags in such a way that it involves a displacement by one code, the coincidence gate K1Z responds and triggers, by way of the AND gate UG1Z together with the information in the memory S1Z', an answer signal on the line 5, which answer signal agrees with the code in the memory S1Z' and, therefore, also with the code expected as an answer by the interrogation device. Simultaneously, another signal is applied to the correction device 2 which, analogously to the measures described in connection with the leading time standards, makes changes in the cryptocalculator 3 and/or in the time clock 1, in order to establish synchronism between the interrogation code and the prepared code. The manner of operation described hereinbefore relates to an answering device under normal operating conditions.

For triggering of a special signal, a special arrangement 6 is provided. This is a code signal actuator which can be operated to automatically cause release of a coded signal, for example, in response to mechanical shocks which go beyond a certain degree, or by an operator or other influences if special circumstances arise. The apparatus 6 is connected to one input of an AND gate UGS, whose second input is connected with the memory S3Z' which contains the code 3Z which, in this particular example, corresponds to a third future code. This arrangement provides that in case of a special situation, both inputs of the AND gate UGS are activated and produce a special signal by use of the third future code 3Z at the output 5. If in the interrogation device a code arrives with the third future time reference, it is then immediately perceptible that a special answer signal has been received; i.e., in the answering device a special situation has occurred. This holds true for the reason that normally, by way of the continuously occurring time corrections it is assured through synchronism that a "normal" answer to an inquiry cannot show the code "3Z." If the program, as provided, is further changed in dependence on time, i.e. the code "3Z" is shifted to the position of the code "2Z" and for the code "3Z" a new code "4Z" is shifted to the position where the "3Z" code was previously stored. Then also the interrogation device knows from the known code sequence of the answering device that now also the new code "4Z" is to be appraised as a special signal. Attention is invited that in this connection that the code 3Z, for that time when it is used as a special signal, cannot be released by a normal interrogation. This is assured by not providing a coincidence gate which would take a position of K3Z, in contrast to the other code memories.

For triggering the special signal, advantageously all of the coincidence gates K2V to K2Z may be connected in multiple, in a manner not represented in detail, with the AND gate UGS (as an OR function), which is provides that only interrogations with this special signal are answered which lie within a certain tolerance range of the time clock 1 (from 2Z to 2V). This can be done in an analogous manner, as illustrated in FIG. 2, for only the coincidence gate KG.

Transmission of the special signal can take place in addition to the normal answer signal which corresponds to the interrogation; it is possible, however, to suppress the answer code corresponding to the interrogation code and to transmit only the preferably coded special signal. In this case the AND gates UG1Z to UG1V are to be blocked on triggering of the special signal. If transmission of the special signal is allowed only when an interrogation signal arrives with a momentarily valid G code, then merely a connection of the coincidence gate KG to the AND gate UGS is necessary, which has to be completed as an additional connection for the transmission of the special signal. This is represented in FIG. 2 which shows a supplemented part of the apparatus of FIG. 1. In FIG. 2, the gate UGS has three inputs, one for the code 3Z, one connected to the output of the coincidence gate KG and one for triggering of the special signal from the apparatus 6, which may be an impact responsive switch, a manually operated switch, or the like. A special signal 3Z is transmitted, therefore, only if there is present both an interrogation in the G code and also a triggering of the special signal. On the other hand, through an inverter stage N, on triggering of the special signal at the apparatus 6, an answer in the G code is suppressed, so that only the special signal is transmitted in the 3Z code.

For all answering devices allocated to an interrogation device, or to a system of interrogation devices, there must be established the same future code as the special signal. Further, it can be advantageous to provide a variation in the code transmitted by the answering device as a special signal, whose variation program is also known at the interrogation device.

The question of which future code "nZ" is transmitted as a special signal depends on the accuracy of the timing device and the possible memory expense.

A further and expedient development of the invention resides in the provision of codes used for sending as special signals. These codes are prepared as a precautionary measure and are releasable immediately on triggering of the special signal.

It is also advantageous if the preparation of the codes for the special signal takes place in a respective storage devices, and that the answering device, according to the invention, can be used with special expediency as a transponder in a secondary radar system.

A simple example of a cryptographic code is described in the aforementioned book by Wise et al on Pages 49 and 50. This code is continuously changed in time and cannot be imitated or decoded by third parties, but can be reproduced both by a main station and a remote station. From the foregoing, it is readily apparent that agreement must exist between all answer devices associated with one or several interrogation stations and the interrogation stations and the code is to be utilized as the special signal. In the example set forth in FIG. 1 the third future code 3Z provided as the special signal. It should be noted, however, that if an answer device would apply the code 1Z as a special signal, another code 7Z and a third code 4Z, the ground station equipment would be very expensive. However, if a certain code is uniformly applied, for example, the 3Z code for all answer devices, then only one decoding device is required, for the exemplary 3Z code, at the interrogation stations, and not for the codes 4Z, 7Z etc.

It is also possible, however, to provide a certain variation and to associate the 3Z code to one group of answer devices as a special signal, for example, and the code 4Z to another group as the special signal, since then several special signals may simultaneously be transmitted by the answer devices.

Figure 3:
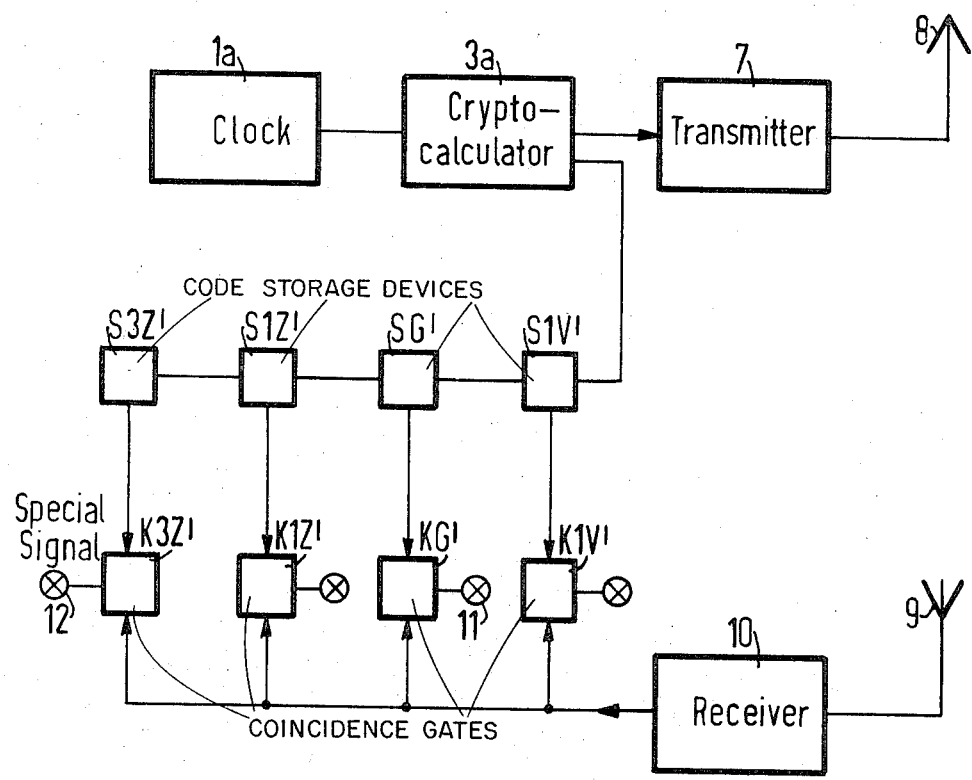
FIG. 3 is a block diagram of an interrogation station.

Referring to FIG. 3, the interrogation station for the arrangement according to FIG. 1 has been illustrated. It contains a clock 1a (time normal) and a cryptocalculator 3a. These two elements have been constructed in the same manner as elements 1 and 3 of FIG. 1, and both clocks run synchronously. The interrogation codes reach a transmitter 7 and are emitted via an antenna 8. These interrogation codes are then received at the answer device, at the terminal 4. Thus, the codes 2V, 1V, G, 1Z, 2Z, etc., are transmitted, one after the other.

If a special signal is transmitted by the system 6 according to FIG. 1 via the AND gate UGS, it will be received by the receiving antenna 9 of the interrogation station, and will reach a receiver 10. This receiver supplies the demodulated received signals at the coincidence gates K3Z', K1Z', KG', K1V'. Simultaneously, the codes 3Z' through 1V' are processed from the output of the cryptocalculator 3a into the code memories S3Z' through S1V', whose construction and mode of operation corresponds to the analogously denoted systems of FIG. 1.

If a correctly timed answer signal passes from the receiver 8 to the coincidence gate, the latter would have the code G' (equal presently valid code), and a reaction of the coincidence gate KG' will result. This reaction may, for instance, be realized by a lamp 11 which would make it clear to the observer that the reply device has answered correctly and that no special situation is given.

If, however, a special signal is transmitted (= application of the code 3Z'), only the coincidence signal K3Z' will react, and a corresponding indication will result, for instance by means of a reaction of a lamp 12. This indication will make it clear to the observer that the answer device answered with the special signal, i.e., that an emergency situation exists.

In summary, when an enemy shell strikes an airplane having apparatus constructed in accordance with the present invention, or the aircraft has come into an emergency situation and the aircraft commander initiates operation of the special signal apparatus 6, the apparatus will transmit the special signal characterizing an emergency situation. If the aircraft always uses the same special signal, it is not difficult for an enemy to determine the special signal and to provide countermeasures. Therefore, opposing aircraft who send in the special signal would not be recognized at the interrogation station as an enemy aircraft, but would be treated as a friendly aircraft in the emergency, and would not, therefore, suffer attack or retaliation. The essence of the invention, briefly stated, resides in the fact that no timely constant special signal is transmitted, but that a special signal is transmitted which changes with time. Therefore, an answer code is employed with the answering device which would be applied only in the future of a presumed steady program change of the answer code. This code cannot be imitiated by apparatus in an enemy aircraft since such code has not previously occurred. On the other hand, the interrogation station, having knowledge of the fact that such codes should only occur in the future at such time when an answer arrives, i.e., for example after two further code changes of the answer codes, can determine the difference between a genuine special signal and an imitation produced in an enemy aircraft.

Many changes and modifications may be made in the invention by one skilled in the art without departing from the spirit and scope of the invention and it is to be understood that I intend to include within the patent warranted hereon all such changes and modifications as may reasonably and properly be included within the scope of my contribution to the art.

I claim:

1. A transponder of a secondary radar interrogation answer system comprising: means for receiving a programmed sequence of interrogation codes from an interrogation device, code means in said transponder for internally producing the programmed sequence of interrogation codes and a corresponding related programmed sequence of answer codes, said internally produced interrogation and answer codes each including past, present and future codes representing past, present and future time, means for comparing the internally produced interrogation codes with a received interrogation code, means responsive to a coincidence between the received code and one of the internally produced interrogation codes, means for transmitting back to the interrogation station an answer code corresponding to the coincidence effected with one of said internally produced interrogation codes, first storage means for storing an answer code corresponding to a future interrogation code and means for transmitting a future answer code to an interrogation device in place of an answer code normally effected in response to coincidence, as a special situation signal representing an emergency situation.

2. A transponder according to claim 1, comprising clock means connected to said code means and operable to produce clock pulses at a frequency that is synchronized with the interrogation device so that said code means produces the internally generated codes in synchromism with codes which are to be received from the interrogation device, further storage means connected to said code means and including a plurality of first storage sections for storing respective past, present and future internally generated interrogation codes, said code means being connected to said first storage means, which include a plurality of second storage sections for storing respective past, present and future internally generated answer codes, said means for comparing including a plurality of coincidence circuits connected for receiving an interrogation code and to respective ones of said first storage sections and individually operable in response to coincidence between a received interrogation code and one of the stored interrogation codes to indicate synchronism, lead or lag between the two coincident codes, an answer output, a plurality of gating means interposed between respective ones of said second answer code storage sections and said answer output and connected to and controlled by respective ones of said coincidence circuits to gate an answer code to said answer output, additional gating means connected between an answer code storage section and said answer output, and said means for transmitting a future answer code including means for triggering said additional gating means to place a future answer code on said answer output.

3. In a transponder according to claim 2, wherein said means for triggering includes a manually controlled switch.

4. In a transponder according to claim 2, wherein said means for triggering includes impact responsive switch means.

5. In a transponder according to claim 2, wherein said storage device which stores said future answer code is connected in series with said second storage devices to receive and store as said special situation signal one of said answer codes which corresponds to a code representing an extreme future time.

6. In a transponder according to claim 5, wherein said additional gating means includes an AND gate, and said trigger means is connected to an input of said AND gate, other trigger means including an OR gate and connections from each of said coincidence circuits to inputs of said OR gate, said OR gate connected to said AND gate, inverter means connected between the first-mentioned trigger means and said plurality of gating means to inhibit gating of an answer code from said second storage sections upon gating of the code from the storage section which stores said future answer code.

7. In a transponder according to claim 5, wherein said additional gating means includes an AND gate, said trigger means is connected to an input of said AND gate, said answer storage sectin section storing said future answer code connected to and input of said AND gate and one of said coincidence circuits connected to an input of said AND gate to gate said special signal upon coincidence of a corresponding interrogation code and the conjunct operation of said trigger means.

8. In a transponder according to claim 1, wherein said means for storing said answer code which corresponds to a future interrogation code is included in means for storing answer codes corresponding to past, present and future interrogation codes, and comprising means for operating said transmitting means to emit said special signal answer code.

9. In a transponder set forth in claim 8, wherein said means for storing answer codes corresponding to past, present and future interrogation codes comprises a shift register which constitutes the respective storage sections.

10. In a transponder according to claim 8, comprising means for preventing transmission of an answer code corresponding to a present interrogation code in response to operation of said means for operating said transmitting means.

* * * * *